Figure 4:
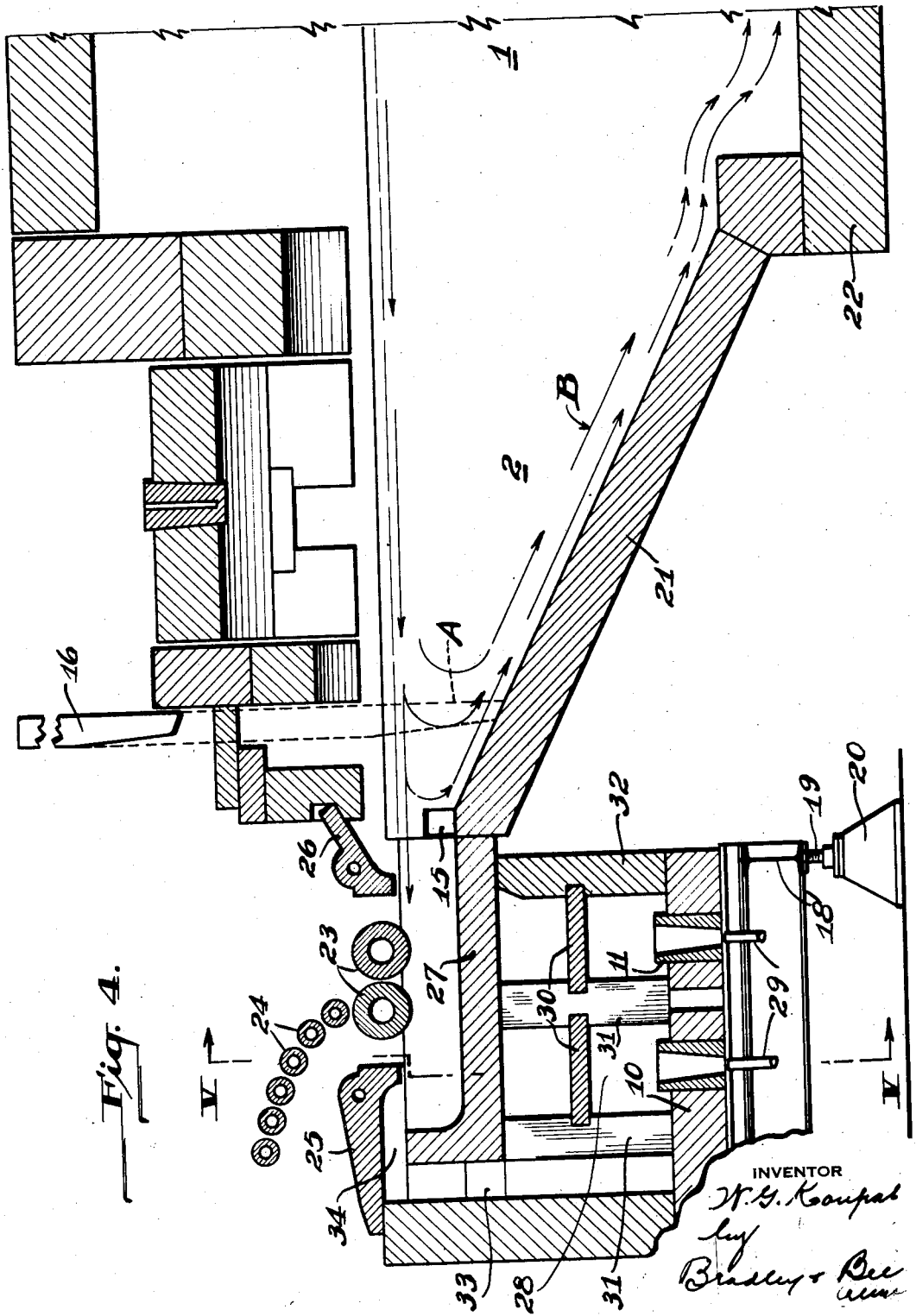

Dec. 18, 1934. W. G. KOUPAL 1,984,932
TANK CONSTRUCTION
Filed Sept. 20, 1932 3 Sheets-Sheet 1
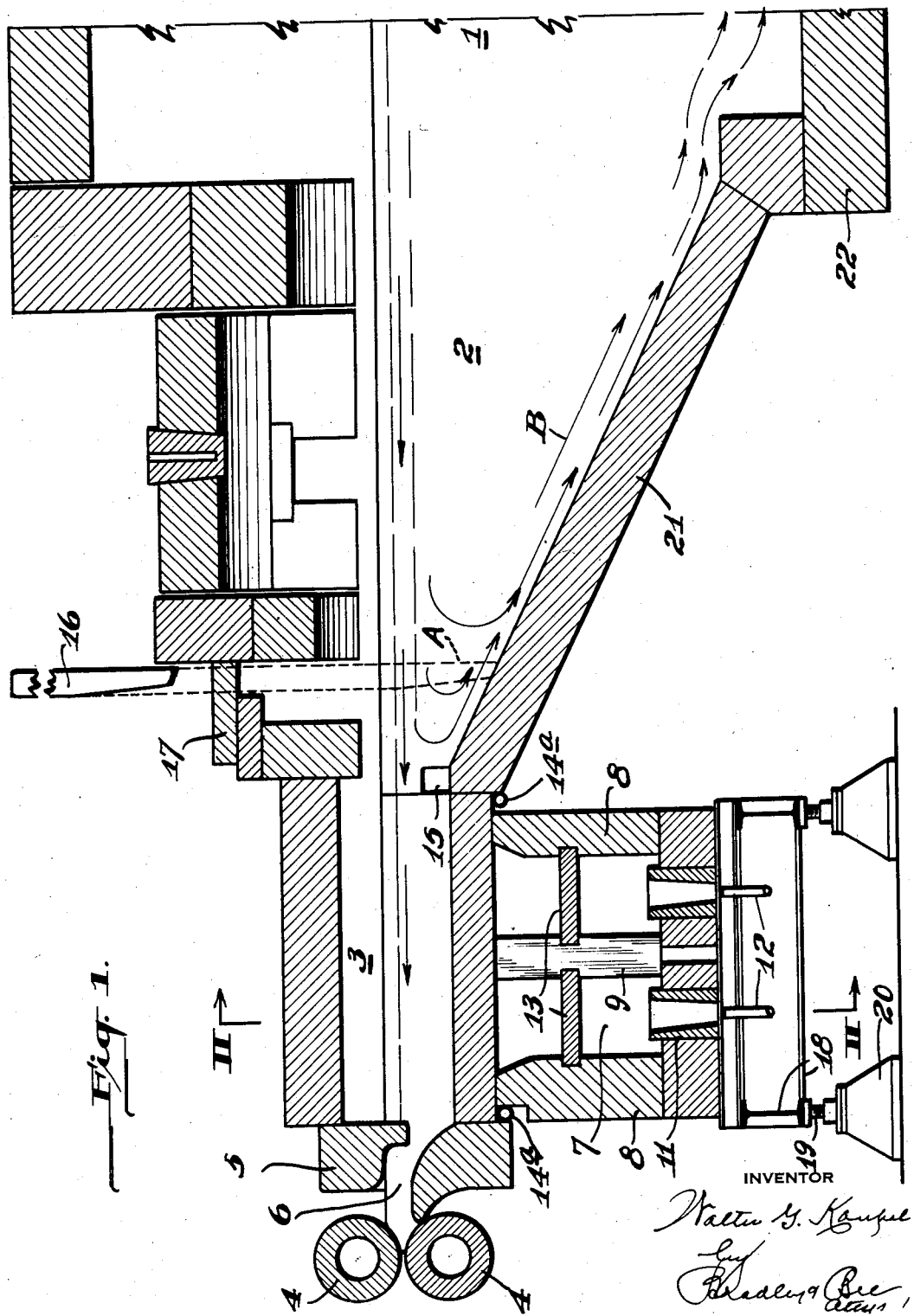

Dec. 18, 1934.    W. G. KOUPAL    1,984,932
TANK CONSTRUCTION
Filed Sept. 20, 1932    3 Sheets-Sheet 2
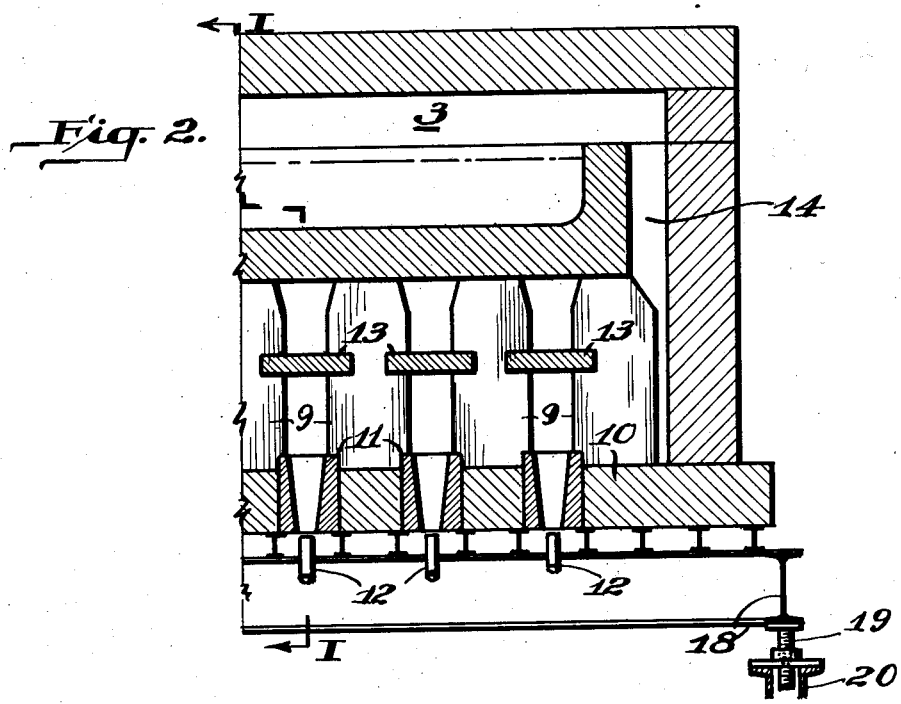
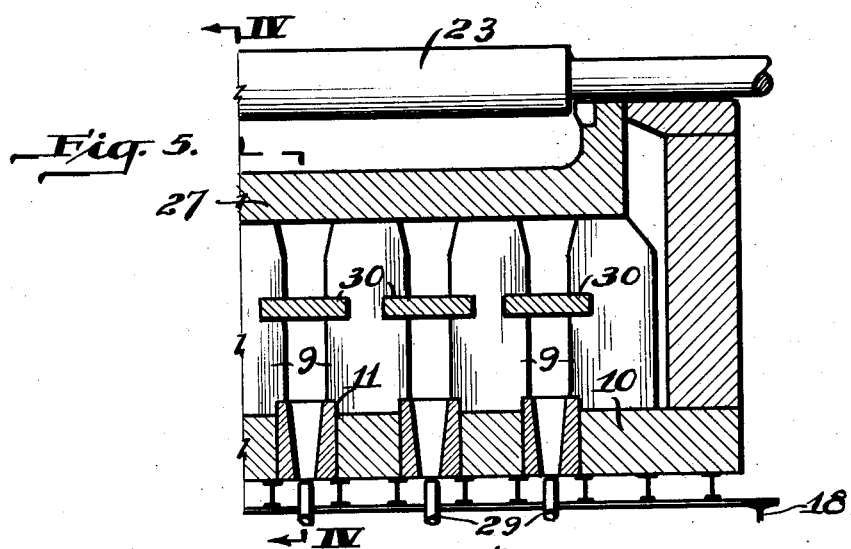
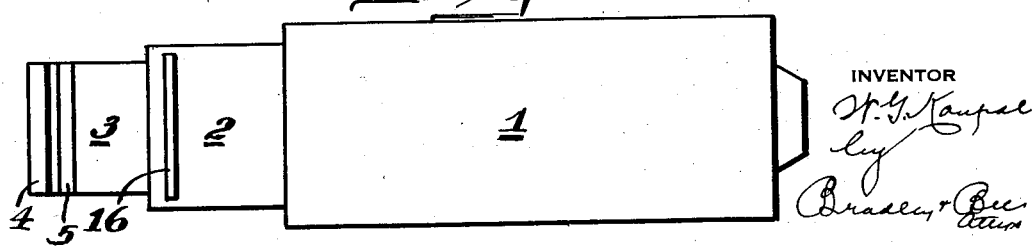
INVENTOR Dec. 18, 1934.   W. G. KOUPAL   1,984,932
TANK CONSTRUCTION
Filed Sept. 20, 1932   3 Sheets-Sheet 3

INVENTOR
W. G. Koupal
by
Bradley & Bee

Patented Dec. 18, 1934

1,984,932

UNITED STATES PATENT OFFICE 1,984,932

TANK CONSTRUCTION

Walter G. Koupal, Tarentum, Pa., assignor to Pittsburgh Plate Glass Company, a corporation of Pennsylvania Application September 20, 1932, Serial No. 633,980

4 Claims. (Cl. 49—56)

The invention relates to a tank construction for use in the making of plate or window glass and to a method of draining the drawing pot to permit of replacement or repair. It has for its principal objects, the provision of improved means for heating the draw pot wherein a more uniform application of the heat and greater efficiency are secured than has heretofore been the case; and the provision of improved means and method for draining and leveling the draw pot; and the provision of an improved forehearth construction whereby any tendency to the formation of bubbles at the end of its bottom wall adjacent the melting tank is avoided. Certain embodiments of the construction are shown in the accompanying drawings, wherein:

Figure 1 is a vertical section on the line I—I of Fig. 2. Fig. 2 is a half section on the line II—II of Fig. 1. Fig. 3 is a diagrammatic plan view of the general arrangement of tank, forehearth and pot. And Figs. 4 and 5 illustrate a modification, Fig. 4 being a section on the line IV—IV of Fig. 5, and Fig. 5 a section on the line V—V of Fig. 4.

Referring first to the construction shown in Figs. 1, 2 and 3, 1 is a melting tank which is of the usual regenerative type; 2 is a forehearth or cooling chamber at the front end of the melting tank; 3 is a drawing pot to which the forehearth discharges; and 4, 4 are sizing rolls at the outlet end of the pot, to which the glass withdrawn from the pot passes in a continuous sheet with the usual roller leer, well-known in the art and not shown.

The pot at its forward end has a wall 5 having an outlet slot 6 through which the glass discharges to the rolls 4, 4. The pot is heated from beneath by means of the heating chamber 7 and is supported upon the end walls 8, 8 of the chamber and upon suitable stools or pillars 9 (Fig. 2) carried by the bottom wall 10 of the chamber. The bottom wall of the chamber is provided with the burner blocks 11 which are directed upwardly and are supplied with gas by means of the pipes 12. Located above the burner blocks 11 are baffle plates 13 of refractory material. The hot gases of combustion, after circulating through the chamber and heating the pot 3 flow up over the sides of the pot through the passages 14 (Fig. 2) and discharge into the pot above the surface of the molten glass therein. The heating arrangement, including the vertically directed burners distributed over the bottom of the heating chamber with the baffles 13 thereabove insures a good heat distribution over the bottom of the pot. The use of the baffles prevents the heat from the burners from being localized on the bottom of the pot and provide incandescent surfaces to promote surface combustion, thus insuring a more complete burning of the gases than would otherwise be the case. The water cooled pipes 14$^a$, 14$^a$ are employed in order to prevent leakage at the joints which lie just above the pipes. In order to provide for the drainage of the pot, the tap hole 15 is employed, such tap hole being normally closed by a block which may be removed. In order to cut off the flow of glass from the forehearth into the pot during the draining operation, a water cooled shear cake or gate 16 is employed, which gate may be lowered during the draining operation to the dotted line position indicated at A. When the gate is in raised position, as illustrated, the top of the forehearth is closed by means of the block 17. When the gate is lowered, the pot or basin may be drained without shutting off the fires in the heating chamber and the pot can be removed hot and empty and the new one set in place immediately without loss of time and material. After a new pot has been set, the operation is very quickly started again by raising the gate, at which time the cold glass is soon remelted, permitting a flow into the pot. In order to completely drain the pot or basin, it is necessary to be able to incline the pot by raising its forward end, and this is accomplished by mounting the heating chamber 8 upon the framework, which may be tilted. This framework consists of the channels 18, 18 mounted upon the jacks 19, such jacks being carried by suitable supports 20. The necessary tilting is accomplished by operating the forward jacks, thus tilting the chamber and the pot 3 slightly to the rear.

The forehearth 2 presents a feature of improvement in that its bottom wall or floor 21 slopes from the end of the draw pot down to the bottom wall 22 of the tank proper, the inclination being preferably about 30 degrees, although this may be varied depending upon conditions. This construction presents an advantage over the type of forehearth heretofore used wherein the bottom wall or floor sloped only for a short distance back from the end of the pot, at which point a vertical wall was provided extending down to the level of the bottom of the melting tank. With such prior construction, bubbles will form at the juncture of the sloping bottom and the vertical wall which rise along the face of the wall and are carried into the direct flow of the glass and into the rolled plate. The elimination of the vertical wall of the forehearth and the extension of the inclined floor down to a point adjacent the bottom of the tank proper obviates this difficulty since the construction shown results in convection currents B (Fig. 1) downward along the floor or wall 21 so that any bubbles which may be formed are carried to the rear instead of being directed to the rolls.

Figs. 4 and 5 illustrate the applications of the improved forehearth and heating chamber construction to a vertical rolling apparatus. This apparatus, which is well-known in the art, comprises a pair of sizing rolls 23 whose lower peripheries engage the surface of the glass. These rolls are water cooled and driven so as to direct the glass sheet upwarly over the apron rolls 24 and through a roller leer not shown. In this construction, a pair of lip tiles 25, 26 act as a partial cover for the surface of the glass in the pot 27. Located beneath the pot is a heating chamber 28 corresponding to the heating chamber 7 of the construction heretofore described. This chamber is provided with upwardly directed burners 29 above which are located the baffle plates 30. The pot is supported from the chamber by means of the stools 31 and the back wall 32 of the chamber. The gases of combustion are in this case directed upwardly through the flues 33 at the front end of the pot and discharge into the space 34 below the lip tile 25. Provision is made in this case as in the construction heretofore described for draining the pot through the tap hole 15. The means for tilting the pot including the jacks 19 being the same as heretofore described. The jacks also serve as a means for leveling the pot so that it may be kept as nearly full as possible without overflowing. The construction of the forehearth 2 is the same as heretofore described.

What I claim is:

1. In combination with a glass melting tank, a removable pot at the end of the tank from which the glass is withdrawn, a movable cut off gate mounted for vertical movement in the tank adjacent the pot and adapted in lowered position to engage the bottom of the tank and cut off the flow of glass to the pot, a drainage outlet for the pot at one end thereof provided with a removable closure and means for tilting the pot so that the bottom thereof slants downward to said outlet.

2. In combination with a glass melting tank, a removable pot at the end of the tank from which the glass is withdrawn, a movable cut off gate mounted for vertical movement in the tank adjacent the pot and adapted in lowered position to engage the bottom of the tank and cut off the flow of glass to the pot, a drainage outlet for the pot at one end thereof provided with a removable closure, a framework supporting the pot and adjustable supporting means for the framework for leveling it and for tilting it to drain the pot when said closure is removed.

3. In combination with a glass melting tank, a removable pot at the end of the tank from which the glass is withdrawn, a movable cut off gate mounted for vertical movement in the tank adjacent the pot and adapted in lowered position to engage the bottom of the tank and cut off the flow of glass to the pot, and a drainage outlet for the pot in the side wall of the tank at the end of the pot forward of the gate provided with a removable closure.

4. In combination with a glass melting tank, a removable pot at the end of the tank from which the glass is withdrawn, a movable cut off gate mounted for vertical movement in the tank adjacent the pot and adapted in lowered position to engage the bottom of the tank and cut off the flow of glass to the pot, a drainage outlet for the pot in the side wall of the tank at the end of the pot forward of the gate provided with a removable closure, and means for tilting the tank so that its bottom slants downward from front to rear to facilitate draining it.

WALTER G. KOUPAL.